United States Patent Office 2,932,624
Patented Apr. 12, 1960

2,932,624

ZIRCONIUM STABILIZED RESINOUS COMPOSITIONS

Harold M. Olson, Hudson, Ohio, assignor to The Harshaw Chemical Company, Cleveland, Ohio, a corporation of Ohio No Drawing. Application September 27, 1957
Serial No. 686,567

4 Claims. (Cl. 260—45.75)

This invention relates to zirconium alcoholate stabilized polymeric compositions of the vinyl chloride type.

One object of the invention is to provide for novel heat stabilized polymeric vinyl chloride compositions, the compositions being characterized by the presence therein of zirconium alcoholates. Another object of the invention is to provide for novel vinyl chloride dispersion resinous compositions which are characterized by the presence of compounds which not only act as heat stabilizing agents but also as viscosity depressants. Another object of the invention is to provide for novel vinyl chloride dispersion resinous compositions containing zirconium alcoholates and characterized by the fact that they have a greater tendency to dispel air during fabrication and forming operations.

Vinyl chloride dispersions, once prepared, have a tendency to increase in viscosity with aging. This is undesirable in some fabricating operations, as, for example, where cloth is coated with a vinyl chloride dispersion, since the viscosity of the dispersion is an important factor in determining the thickness of the coat retained upon the cloth. Other spreading operations, utilizing vinyl dispersions have similar problems. Pock marks are another problem in fabric coating operations and these marks are attributed to the failure of the resin to adequately release air which is accidentally incorporated in the dispersion. Dip coating, spray coating and centrifugal casting operations have similar difficulties in the release of air.

According to the invention herein, it has been discovered that vinyl chloride resins may be rendered relatively stable to heat by the incorporation therein of certain zirconium tetra alcoholates. The zirconium tetra alcoholates may be characterized by the following formula: $Zr(OR)_4$, wherein R is selected from the group consisting of alkyl radicals having from 2 to 18 carbon atoms, a phenyl radical, monoalkylphenyl radicals where the alkyl portion of the radical has from 1 to 9 carbon atoms, and 6,6-dimethyl-bicyclo [3.1.1]-2-heptenyalkyl radicals where the alkyl portion of the radical referred to has from 1 to 4 carbon atoms. These zirconium alcoholates may be divided into two classes, namely (1) the zirconium alkoxides and (2) the zirconium compounds which may be considered as derived from carbocyclic ring compounds. The radical 6,6-dimethyl-bicyclo [3.1.1]-2-heptenylalkyl is characterized by the following formula:

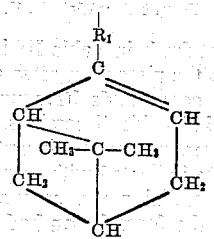

wherein —$R_1$— is alkylene and has from 1 to 4 carbon atoms. 2-β-hydroxyethyl 6,6-dimethyl-bicyclo [3.1.1]-2-heptene is a typical example of an alcohol containing this radical and from which zirconium alcoholates may be prepared. The zirconium tetra alcoholate derived from 2-β-hydroxyethyl 6,6-dimethyl-bicyclo [3.1.1]-2-heptene may be prepared by heating the bicyclo compound with zirconium tetra butoxide, butyl alcohol being evolved during the process. 2-β-hydroxyethyl-6,6-dimethyl-bicyclo [3.1.1]-2-heptene has the following structural formula:

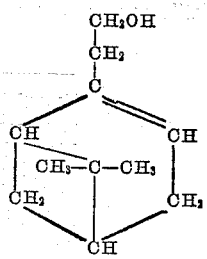

All of the zirconium tetra alcoholates falling within the aforementioned groupings exhibit heat stabilizing properties when incorporated in vinyl chloride resins and also act as viscosity depressants when employed in vinyl chloride dispersion compositions. The zirconium compounds containing the carbocyclic rings exhibit good air release properties in vinyl dispersion compositions. This property is not characteristic of the zirconium tetra alkoxides, however. Vinyl chloride dispersions are suspensions of the resin in non-aqueous liquids which do not dissolve the resin at ordinary temperatures. As is well known, the "plastisols" are vinyl chloride dispersions wherein the liquid phase substantially consists only of plasticizer whereas the "organisols" are vinyl chloride dispersions wherein the liquid phase contains volatile components such as aliphatic and aromatic hydrocarbons in addition to the plasticizer.

Typical zirconium tetra alkoxides which may be employed, according to the invention, are zirconium tetra ethoxide, zirconium tetra tridecyloxide and zirconium tetra stearoxide. Other suitable zirconium tetra alcoholates which may be employed are those derived from such $C_2$ to $C_{18}$ alcohols as normal propyl, butyl, amyl, hexyl, etc. alcohols and their isomeric forms. Typical zirconium tetra alcoholates which may be considered as derived from carbocyclic ring compounds and which not only exhibit heat stabilizing and viscosity depressant properties but also accelerated air release properties are zirconium tetra phenol and zirconium tetra nonylphenol. Other alcohols from which the carbocyclic ring containing zirconium compounds may be derived are methylphenol, ethylphenol, proylphenol, butylphenol, amylphenol, hexylphenol, heptylphenol, octylphenol in their various isomeric forms.

The zirconium alcoholates may be used alone to stabilize the vinyl chloride resinous compositions or with other well known vinyl chloride stabilizers such as the well known metal soaps and phosphites. Typical metal soaps which may be employed with the zirconium compounds are barium and cadmium laurate, zinc stearate, calcium stearate and tin ethylhexoate. The amount of zirconium tetra alcoholate employed for stabilizing the vinyl chloride resins ranges from .25 to 10 parts of zirconium tetra alcoholate per 100 parts of vinyl chloride resin. Best results appear to be obtained when the zirconium tetra alcoholates are employed in amounts from about 2 to 7 parts of zirconium tetra alcoholate per 100 parts of resin. Although reference is made here principally to vinyl chloride resins, it will be apparent that in addition to vinyl chloride polymers, that copolymers thereof wherein the vinyl chloride is the predominant resinous component may also be employed. Vinylidine, vinyl acetate and diethyl maleate copolymers of vinyl chloride typify copolymeric constitutents. Extenders or fillers, pigments and such plasticizers as are appropriate, of course, may be employed in the novel compositions of the invention.

The zirconium alcoholates may be incorporated in the vinyl chloride resinous compositions in manners well known in the art. For example, with rigid and so-called plasticized rigid or semi-rigid stock, the zirconium tetra alcoholates may be milled into the resins together with extenders, pigments and plasticizers where appropriate. In the case of the dispersed resins, those zirconium tetra alcoholates which are liquid, may be mixed with the resin plasticizers and volatile components, where the latter are employed, together with extenders, pigments and other stabilizers where desirable. When utilizing a zirconium tetra alcoholate which is solid under normal conditions such as zirconium tetra phenoxide, the zirconium tetra alcoholate may be dissolved in a suitable solvent, such as xylene, tridecyl alcohol or white mineral oil and incorporated together with a solvent into the resin by mixing, as for example, on a Hobart mixer. Other suitable solvents for the zirconium stabilizers may be employed, preferably only in amounts sufficient to dissolve the zirconium compound. On the other hand, the solid zirconium alcoholates may be dispersed in the resin by ball milling with the resin and other additives.

The material set forth in Table I illustrates the heat stabilizing properties of certain select zirconium tetra alcoholates. The plastisol formulations set forth in Table I were prepared by intimately mixing the resin and plasticizer with a solvent solution of the indicated zirconium tetra alcoholate. Although a solvent is unnecessary, except for zirconium tetra phenoxide, the solvent was employed in the case of the other zirconium alcoholates for comparative purposes. The mixing was conducted for about 1 hour and thereafter, the air removed from the dispersions by subjecting them to a vacuum for about 15 minutes. The heat stability imparted to the formulations by the zirconium tetra alcoholates was ascertained by first casting a plurality of 7.5 mil samples of each formulation. The samples were polymerized by subjecting the cast samples to a temperature of 350° F. for 15 minutes. At this point, control formulations Nos. 1 and 2 were removed from the oven and utilized for comparison purposes. The balance of the samples obtained from formulations 3 through 9 were left in the oven at a temperature of 350° F. and the amount of time determined, subsequent to the removal of the control samples, before the samples developed the same color as formulation No. 1. Formulation No. 2 was prepared to illustrate that the solvent, tridecyl alcohol, imparted no heat stability to the resin. It will be noted in the case of each formulation containing a zirconium tetra alcoholate that a substantial increase in heat stability developed.

*Table I*

| Formulation No. | 1 | 2 | 3 | 4 | 5 | 6 | 7 | 8 | 9 |
|---|---|---|---|---|---|---|---|---|---|
| Vinyl chloride resin (Geon 121) | 100 | 100 | 100 | 100 | 100 | 100 | 100 | 100 | 100 |
| Dioctyl phthalate (GP-261) | 65 | 65 | 60 | 65 | 65 | 65 | 65 | 65 | 65 |
| Zirconium tetra butoxide | | | 3.5 | | | | | | |
| Zirconium tetra ethoxide | | | | 2 | | | | | |
| Zirconium tetra stearoxide | | | | | 5 | | | | |
| Zirconium tetra tridecyloxide | | | | | | 5 | | | |
| Zirconium tetra phenoxide | | | | | | | 5 | | |
| Zirconium tetra nonylphenoxide | | | | | | | | 5 | |
| Zirconium tetra alcoholate derived from 2-β-hydroxyethyl-6, 6-dimethyl-bicyclo [3.1.1]-2-heptene | | | | | | | | | 5 |
| Tridecyl alcohol | | 5 | | | 5 | 5 | 5 | 5 | 5 |
| Xylene | | | | 8 | | | | | |
| White mineral oil | | | 7.5 | | | | | | |
| Time at 350° F. to develop same color as formulation No. 1 (minutes) | 0 | 0 | 10 | 15 | 40 | 40 | 25 | 25 | 40 |

The material set forth in Table II illustrates the viscosity suppressing properties characteristic of the zirconium tetra alcoholates. The formulations in this table were prepared substantially in accordance with the procedure set forth with respect to the formulations of Table I except that a solvent, tridecyl alcohol, was used only with zirconium tetra phenoxide, whereas the solvents utilized in Table I were incorporated for comparative purposes. Control formulations 1 and 3 illustrates the high viscosities which are developed on aging when the formulations do not contain a viscosity depressant and formulation No. 1 especially illustrates the rapid increase in viscosity after initial preparation. It will be noted that in each case where the formulation contained a zirconium tetra alcoholate that the viscsity, 14 days after preparation of the mixture, was materially reduced as compared to the viscosities of the control samples.

*Table II*

| Formulation No. | 1 | 2 | 3 | 4 | 5 | 6 | 7 |
|---|---|---|---|---|---|---|---|
| Vinyl chloride resin (Geon-121) | 100 | 100 | 100 | 100 | 100 | 100 | 100 |
| Dioctyl phthalate (GP-261) | 65 | 65 | 60 | 60 | 60 | 60 | 60 |
| Epoxidized Soy Bean Oil (Paraplex G-62) | 5 | 5 | | | | | |
| Barium-Cadmium laurate [1] | 2.5 | 2.5 | | | | | |
| Organic phosphite stabilizer [2] | 1.0 | 1.0 | | | | | |
| Zirconium tetra tridecyloxide | | | 1.0 | | 5 | | |
| Zirconium tetra butoxide | | | | | | 5 | |
| Zirconium tetra nonylphenoxide | | | | | | | 5 |
| Zirconium tetra phenoxide | | | | | | | 5 |
| Tridecyl alcohol | | | | | | | 5 |
| Viscosity (cp) 1 hour after preparation [3] | 7,600 | 6,300 | 16,300 | 8,700 | 7,000 | 8,250 | |
| Viscosity (cp) 14 days after preparation | 20,600 | 8,200 | 21,800 | 9,500 | 6,500 | 8,250 | 6,700 |

[1] Barium-cadmium laurate heat stabilizing mixture containing 16% barium and 8% cadmium.
[2] 70% (50/50) mixture of triphenyl phosphite and triisooctylphosphite, balance plasticizer.
[3] Viscosities taken at about 75° F. by using a number 4 spindle on a Brookfield L. V. viscometer at 12 r.p.m.

The material set forth in Table III illustrates the beneficial effect which the zirconium tetra alcoholates derived from carbocyclic compounds have upon the air release properties of vinyl chloride dispersions. The formulations set forth therein were prepared substantially in accordance with the procedure indicated with respect to the formulations in Table I utilizing the components indicated in Table III. After the formulation had been prepared and permitted to age for 24 hours at room temperature, the air release information was obtained by injecting 0.2 cc. of air, ¾" below the surface of a beaker containing a sample of the dispersion formulation, the air being injected into the dispersion by means of a syringe. The time reported is the time measured from the point in time when the bubble of air reached the surface of the formulation, to the point in time when the bubble broke. It is apparent from a comparison of formulation Nos. 2 and 3 with formulation No. 1 that the zirconium alcoholates derived from the carbocyclic compounds materially aid the release of air from the vinyl dispersions.

*Table III*

| Formulation No. | 1 | 2 | 3 |
|---|---|---|---|
| Vinyl chloride resin (Geon 121) | 100 | 100 | 100 |
| Dioctyl phthalate (GP-261) | 60 | 60 | 60 |
| Zirconium tetra phenoxide | | 5 | |
| Zirconium tetra alcoholate derived from 2-β-hydroxyethyl-6,6-dimethylbicyclo [3.1.1]-2-heptene | | | 5 |
| Tridecyl acohol | | 5 | |
| Air release time (sec.) 1 hour after preparation | 25 | 8 | 13 |
| Air release time (sec.) 24 hours after preparation | 25 | 10 | 11 |

I claim:
1. A vinyl chloride dispersion containing a heat stabilizer which exhibits good air release and viscosity depressant properties, said stabilizer being selected from the group consisting of zirconium tetra phenoxide, zirconium tetra nonylphenoxide and a zirconium tetra alcoholate derived from 2 - β - hydroxy ethyl - 6,6 - dimethylbicyclo [3,1,1]-2-heptene.

2. A vinyl chloride polymeric dispersion according to claim 1 wherein said stabilizer is zirconium tetraphenoxide.

3. A vinyl chloride polymeric dispersion according to claim 1, wherein said stabilizer is a zirconium tetra nonylphenoxide.

4. A vinyl chloride polymeric dispersion according to claim 1, wherein said stabilizer is a zirconium tetra alcoholate derived from 2-β-hydroxy ethyl-6,6-dimethylbicyclo [3,1,1]-2-heptene.

References Cited in the file of this patent
UNITED STATES PATENTS
2,777,826    Olson _____ Jan. 15, 1957